(12) United States Patent
Lee

(10) Patent No.: US 8,998,600 B1
(45) Date of Patent: Apr. 7, 2015

(54) APPARATUS FOR APPLYING FOAMED MATERIAL IN-PLACE TO SURFACES

(76) Inventor: Jimmy D. Lee, Mountain Home, TX (US)

(*) Notice: Subject to any disclaimer, the term of this patent is extended or adjusted under 35 U.S.C. 154(b) by 576 days.

(21) Appl. No.: 13/181,886

(22) Filed: Jul. 13, 2011

(51) Int. Cl.
*E04D 15/00* (2006.01)
*B29C 65/00* (2006.01)

(52) U.S. Cl.
CPC ................................ *B29C 66/863* (2013.01)

(58) Field of Classification Search
CPC .............................. E04D 15/06; E04D 15/07
USPC .............. 264/40.4, 40.5, 40.7, 31, 33, 34, 35; 425/4 C, 63, 140
See application file for complete search history.

(56) References Cited

U.S. PATENT DOCUMENTS

| | | | | |
|---|---|---|---|---|
| 3,032,815 A | * | 5/1962 | Gerber | 264/70 |
| 3,692,612 A | * | 9/1972 | Carlsson | 425/305.1 |
| 3,954,544 A | * | 5/1976 | Hooker | 425/4 C |
| 4,093,411 A | | 6/1978 | Lee | |
| 4,333,973 A | * | 6/1982 | Bellafiore et al. | 264/46.9 |
| 5,670,178 A | * | 9/1997 | West | 425/4 C |
| 6,024,147 A | * | 2/2000 | Hunter, Jr. | 156/356 |
| 2004/0065973 A1 | * | 4/2004 | Ehbing et al. | 264/40.4 |
| 2009/0048361 A1 | * | 2/2009 | Tackett et al. | 521/155 |

* cited by examiner

*Primary Examiner* — Timothy Kennedy

(57) ABSTRACT

Improved apparatus for in-situ forming of polymeric materials. During formation, the polymeric materials can be applied to horizontal or inclined surfaces such as roofs. The improved apparatus is automatically controlled and laser guided.

5 Claims, 9 Drawing Sheets

APPARATUS FOR APPLYING FOAMED MATERIAL IN-PLACE TO SURFACES

FIELD OF THE INVENTION

The current invention relates to the field of forming polymeric materials in-place, more particularly the field of simultaneously applying such materials to a roof or a wall.

BACKGROUND AND SUMMARY OF THE INVENTION

Expired U.S. Pat. No. 4,093,411 (the '411 patent), owned by the same sole inventor as the present sole inventor and incorporated herein by reference, describes an apparatus for in-place formation of foamed polymeric materials and application of those materials to horizontal, vertical, or inclined surfaces including, but not limited to, structural roofs and walls. As the self-propelled '411 patent apparatus moves along a working surface, it dispenses a strip of foamed polymeric material and, if necessary for a particular application, a strip of friction-reducing material and/or a sheet of protective coating. In a series of iterations the apparatus applies a number of strips sufficient to cover the working surface. The beveled, overlapping strip edges join to form a continuous surface that may be, if desired, covered with a protective coating that is dispensed by the apparatus simultaneously with the dispensing of the foamed polymeric material.

The '411 patent apparatus requires uneconomical manned guidance during each iteration to assure straight-line movement and accurate stopping. It also requires uneconomical and laborious manned relocation after each iteration. When a strip is laid, for example from a roof eve to the roof peak, the '411 patent apparatus must be manually and precisely stopped at the peak and then manually and precisely moved the full length of the strip back to the eve to be ready for laying of the next strip from eve to peak.

The present invention improves upon the '411 patent apparatus by eliminating much of its uneconomical labor requirements. Whereas the '411 patent apparatus has a single frame comprising its transport mechanism, the foam mold, and the dispensing means, the present invention incorporates two frames. A bottom frame comprises the transport mechanism and the foam mold, and a top frame comprises the dispensing means. Because the top frame rotates 180 degrees relative to the bottom frame, the present invention apparatus can apply strips of foamed polymeric material to a working surface while moving forward or backward.

The present invention apparatus also improves over the '411 patent apparatus with the additional capability of computer-controlled motion. The new guidance system enables iterations of precise, repeatable distance with minimum human intervention. Another improvement is the addition of an optional means of dispensing adhesive.

BRIEF DESCRIPTION OF THE DRAWINGS

FIG. 2A is an enlarged side view of the top frame rotation means of the preferred embodiment of the present invention.

FIG. 2B is an enlarged front view of the laser guidance target face of the preferred embodiment of the present invention.

DETAILED DESCRIPTION OF THE PREFERRED EMBODIMENT

Terms used in the application claims and description are intended to have their broadest meaning consistent with the requirements of law. Where alternative meanings are possible, the broadest meaning is intended. All words and phrases are to be interpreted as they are preferentially defined in commonly accepted English language dictionaries, handbooks, textbooks, and treatises except where defined herein. All words used in the claims are intended to be used in the customary usage of grammar and the English language, except for "a" and "an" which can mean "at least one."

As used herein "friction reducer" can mean a slide, a wheel, a roller, a ball, or any other device capable of reducing the friction between objects moving relative to one another.

As used herein "receiver" can mean any device capable of receiving a reflected laser signal and transmitting, broadcasting, or otherwise communicating that signal to another device for manipulation.

Figure 1:
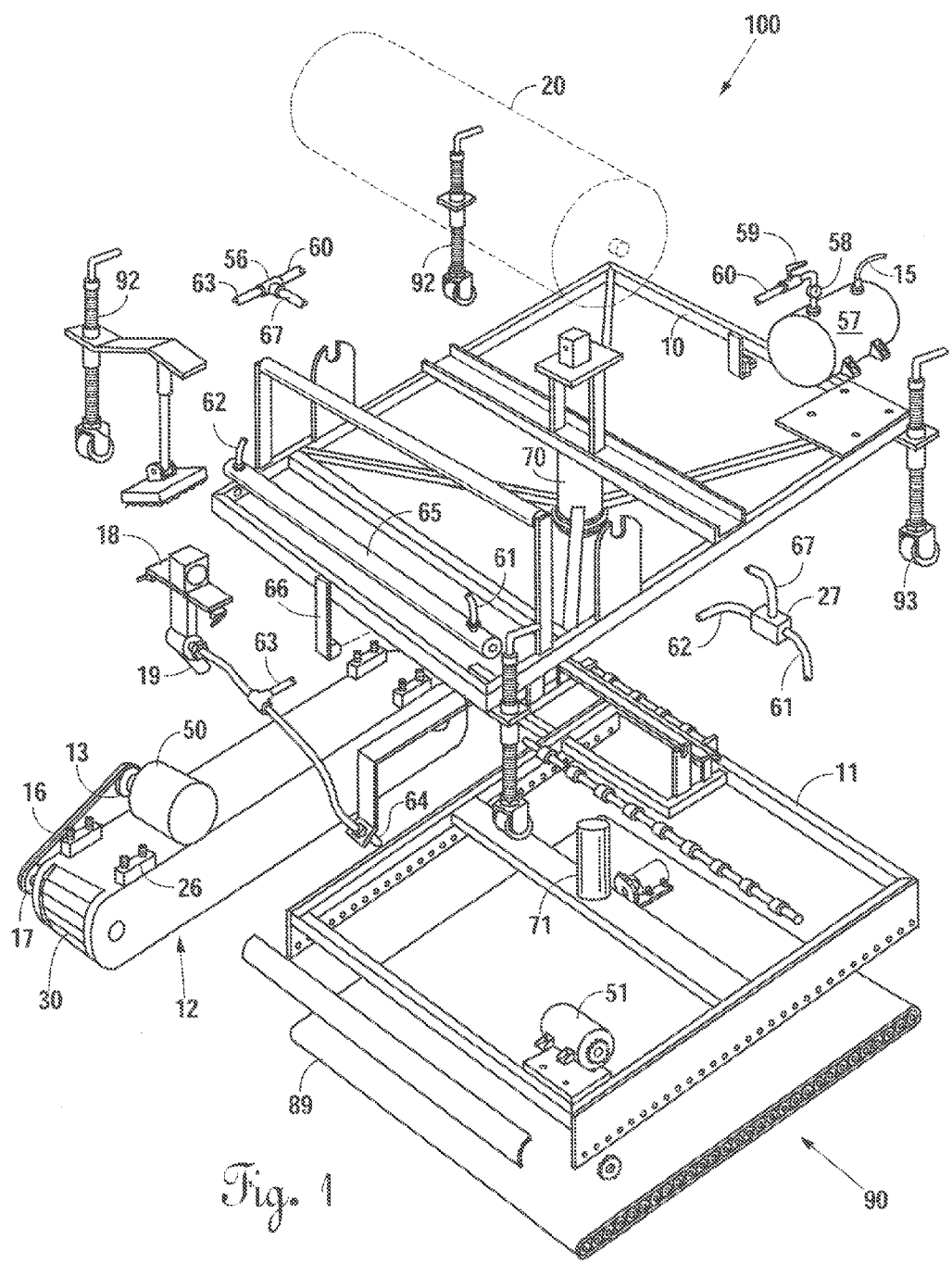
FIG. 1 is an exploded partial view of the preferred embodiment of the present invention.
Figure 2:
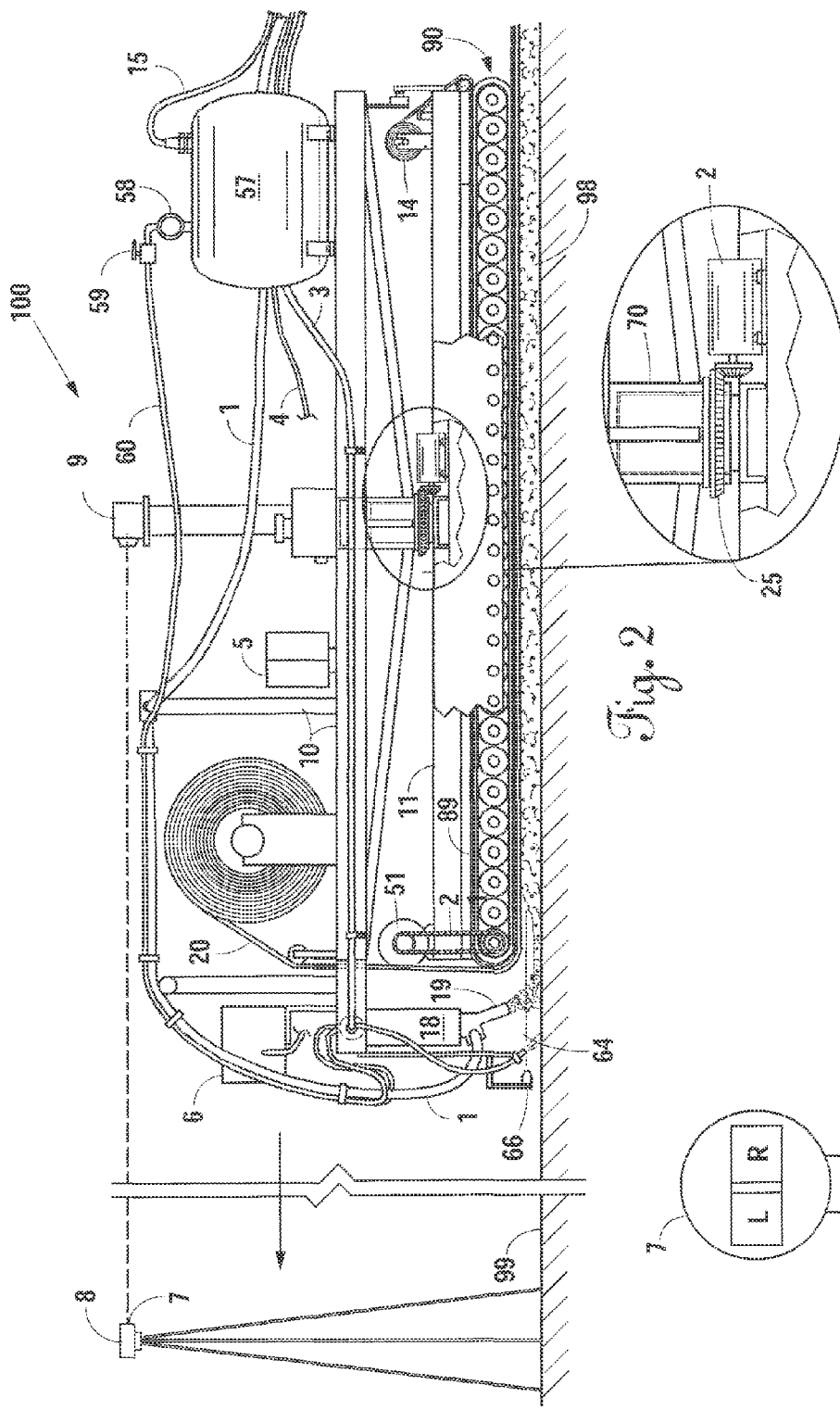
FIG. 2 is a side view of the preferred embodiment of the present invention.

As shown in FIGS. 1 and 2, the preferred embodiment of the current invention apparatus 100 has a top frame 10 that is parallel to, and rotatable with respect to, a bottom frame 11. The axis of rotation of frame 10 is perpendicular to frames 10 and 11, and is centrally located on frames 10 and 11. The rotational hinge of apparatus 100 is comprised of concentric cylindrical members, female pivot tube 70, with pivot tube gear 25 attached, receiving male pivot shaft 71. In the preferred embodiment pivot tube 70 is attached to top frame 10, and pivot shaft 71 is attached to bottom frame 11, but the orientation could be reversed in alternate embodiments. Frames and hinge members are constructed of steel, but could be constructed of any metal or other material with suitable strength and durability.

Drive motor 51, mounted on bottom frame 11, drives belt 21 that drives conveyor belt 89 that propels apparatus 100 along a working surface 99. Steering motor 50 is mounted on steering assembly 12 that is attached to bottom frame 11, and is connected to pulley 13 that drives belt 16. Belt 16 drives pulley 17 that drives steering belt 30 that provides propulsion complementary to that provided by conveyor belt 89. Absolute speed of apparatus 100 over working surface 99 can be varied by variation of the power to motors 50 and 51, both of which are reversible, variable-speed Dayton motors with built-in gear reducers. Motors 50 and 51 are respectively capable of ¾ and 3 hp.

Under ideal conditions, the speeds of motors 50 and 51 are controlled so as to drive steering and drive belts 30 and 89, respectively, at equal speeds in order to produce a straight-line trajectory of apparatus 100. If working surface friction inconsistencies or topography irregularities cause apparatus 100 to veer from a true course, the laser guidance system senses the misalignment and adjusts the speed of steering motor 50. The resulting difference in speeds of motors 50 and 51 moves apparatus 100 in the direction necessary to correct the misalignment, at which time the speed of steering motor 50 readjusts to match that of drive motor 51.

The speed of steering motor 50 is automatically controlled by motor controller 5, the power output from controller 5 to motor 50 being a function of the algorithm programmed into computer 6. The computer algorithm receives variable voltage inputs from guidance laser 9, those inputs being a function of how far the beam from laser 9 falls left (L) or right (R) of the center of target face 7 on target 8 (FIGS. 2 and 2B).

Figure 11:
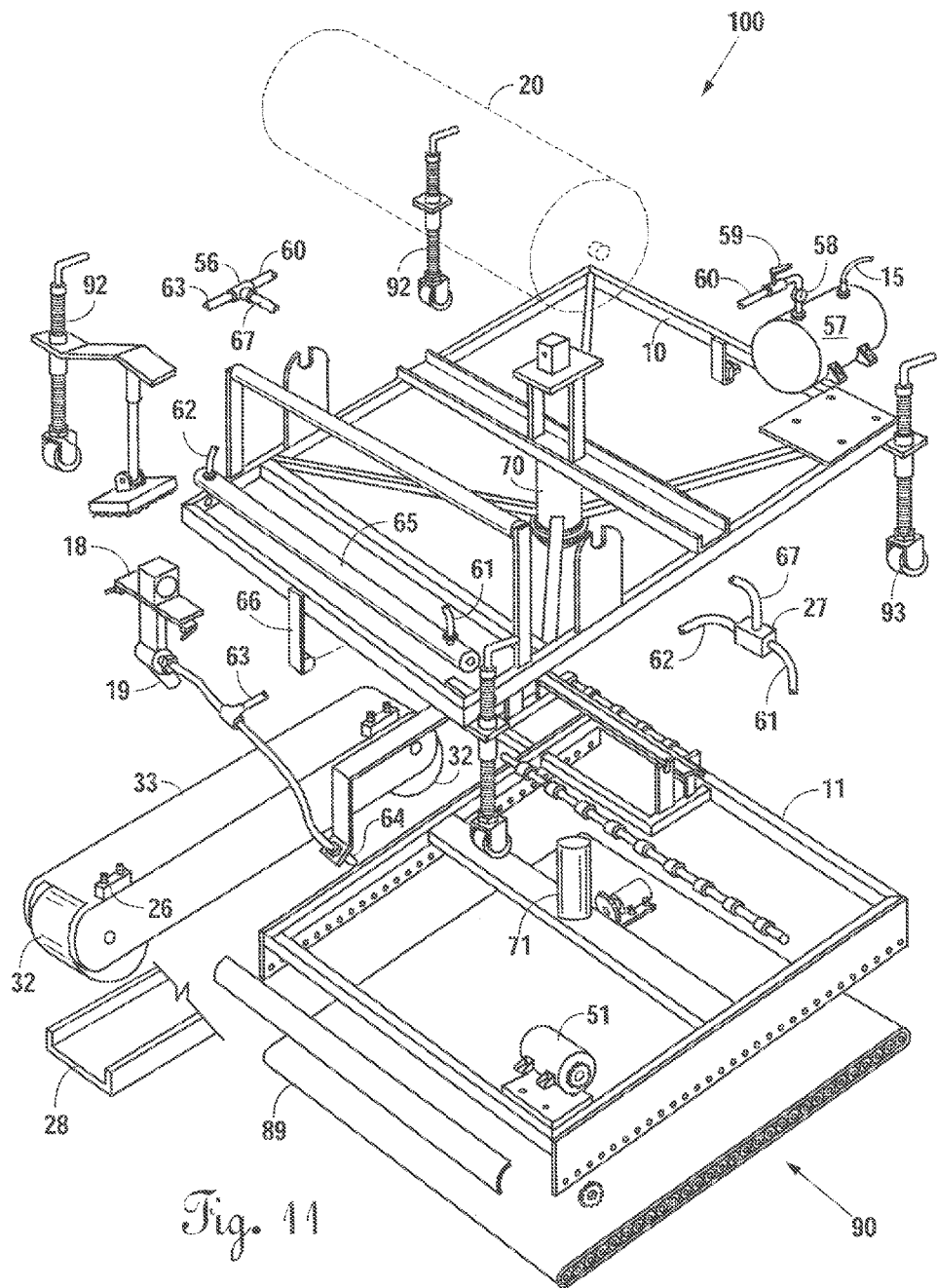
FIG. 11 is an exploded partial view of an alternate embodiment of the present invention.

An alternate embodiment of the present invention employs a mechanical means, rather than a laser guidance system, for maintaining apparatus 100 on a desired straight path. FIG. 11 shows one version of a guidance track, e.g., a channel 28, attached to working surface 99 with screws, nails, or other fasteners. Guidance rollers or wheels 32, free to rotate on axles made a part of guidance assembly 33, are laterally constrained in track 28, thus constraining apparatus 100 to its desired straight path. Guidance assembly 33 is adjusted vertically with steering assembly adjustors 26. Locknuts on the adjustors secure guidance assembly 33 in the location necessary for achieving the desired finished foamed layer thickness. As each strip is applied, another track is placed adjacent to it and the process repeated. During the application of each foam strip, track 28 is covered with foam and remains embedded in the ultimate finished foam surface.

The present invention is an improvement to the '411 patent apparatus that applies a foamed material to a surface. The application process begins with a continuous strip of wood or rigid foam 3 inches wide that is glued or stapled to the perimeter of working surface 99 so as to form a picture frame around the entire surface. The picture frame thickness matches the desired thickness of the finished foamed layer 98.

Figure 4:
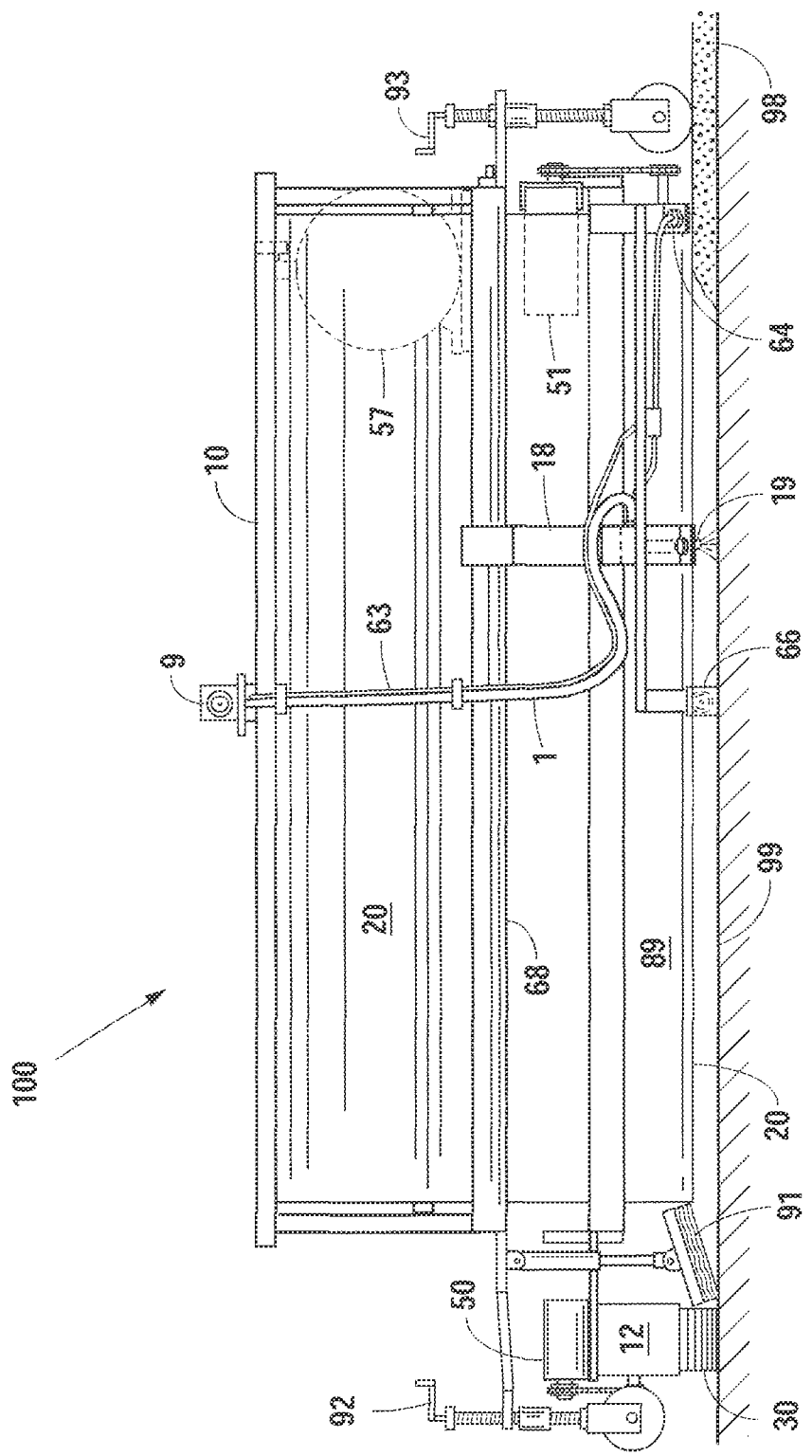
FIG. 4 is a front view of the preferred embodiment of the present invention.

Apparatus 100 is positioned with the right edge, as viewed in FIG. 4, of drive belt 89 and sheet coating 20 parallel to and approximately at the outside edge of one of the sides (the starting side) of the picture frame (not shown). FIG. 2 illustrates how sheet coating 20 is pulled from a roll and under drive belt 89 by the rotation of drive assembly 90. Steering assembly 12 is adjusted vertically with steering assembly adjustors 26 (FIG. 1). Locknuts on the adjustors secure steering assembly 12 so that the bottom plane of sheet coating 20 is level with the top plane of the picture frame, and thus level with the top plane of the desired finished foamed layer 98.

Apparatus 100 then proceeds forward (as indicated by the arrows in FIGS. 2 and 7) powered by drive belt 89 and steering belt 30. It applies a layer of foamed material abutting the inside, or left edge, as viewed in FIG. 4, of the starting side of the picture frame. The foamed layer continues underneath drive belt 89 and sheet coating 20 along their full width and with a consistent height of the desired finished foamed layer 98. The foamed material is disbursed along the full width of drive belt 89 and to the left, as viewed in FIG. 4, of drive belt 89 underneath kickdown assembly 91. The portion of the foamed material underneath the kickdown assembly becomes a beveled edge that will be foamed over during a later forming of the adjacent strip of foamed material.

Apparatus 100 proceeds forward along the starting side of the picture frame until it reaches the end of the starting side. The apparatus may be stopped manually using control panel 24 located on top frame 10 on or near computer 6 or with a predetermined signal generated by the proximity of laser 9 to target 8, in which case the electronic signal is relayed to computer 6 that responds with a command to motor controller 5 that halts motion of apparatus 100. Apparatus 100 can also be stopped with a bottom frame safety feature comprising a limit switch (not shown) with a roller that rolls along working surface 99 and senses a sudden predetermined rise or fall. That motion transmits an electrical signal to computer 6 and motor controller 5, thereby stopping motors 50 and 51 and halting motion of apparatus 100 and the foaming operation.

Upon stopping, apparatus 100 has formed a single strip of foamed material along the starting side of the picture frame. The apparatus is then manually turned 90 degrees, a target is positioned the desired distance away, and the operation is duplicated until all sides of the picture frame have been traversed and all sides of working surface 99 have been covered with a strip of foamed material the width of drive belt 89 plus the bevel. The picture frame (the original edge strips of wood or rigid foam) has been covered with foam and/or sheet coating 20 and presents a continuous, substantially smooth surface.

After application of a strip of foamed material around the perimeter of working surface 99, foamed material must be applied to the remainder of the working surface, i.e., the part of the working surface completely surrounded by the newly formed perimeter of foamed material the width of drive belt 89 plus the bevel. To begin this final stage of the process apparatus 100 is positioned adjacent to one of the completed perimeter strips with the right edge, as viewed in FIG. 4, of drive belt 89 and sheet coating 20 parallel to the completed strip and approximately three inches to the right, as viewed in FIG. 4, of the top of the completed strip bevel. Steering assembly 12 will remain secured with adjustors 26 at the correct height to assure that the bottom plane of sheet coating 20 on drive belt 89 is level with the top plane of the desired finished foamed layer 98 so that all foamed strips have uniform thickness and are parallel to working surface 99.

Apparatus 100 then proceeds forward powered by drive belt 89 and steering belt 30. It applies a layer of foamed material abutting the inside, or left edge, as viewed in FIG. 4, of the previously applied foam strip 98. As apparatus 100 moves forward applying the new foamed strip, the foam continues underneath drive belt 89 and sheet coating 20 along their full width and with a consistent height of the desired finished foamed layer 98. The foamed material is disbursed along the full width of drive belt 89 and to the left, as viewed in FIG. 4, of drive belt 89 underneath kickdown assembly 91. The portion of the new foamed strip underneath the kickdown assembly becomes a beveled edge that will be foamed over during the subsequent forming of the immediately adjacent strip of foamed material.

FIGS. 1-5 illustrate the foaming procedure. As apparatus 100 proceeds forward, foam supplied by a supply and support truck (the Rig) is disbursed from foam nozzle 19. The Rig supplies apparatus 100 with foam in liquid or slurry form through hose 1, compressed air through hose 15, glue through hose 3, and electrical power through cable 4. Reservoir 57 is supplied through hose 15 and provides compressed air to apparatus 100 through gage 58, valve 59, and hose 60.

Figure 5:
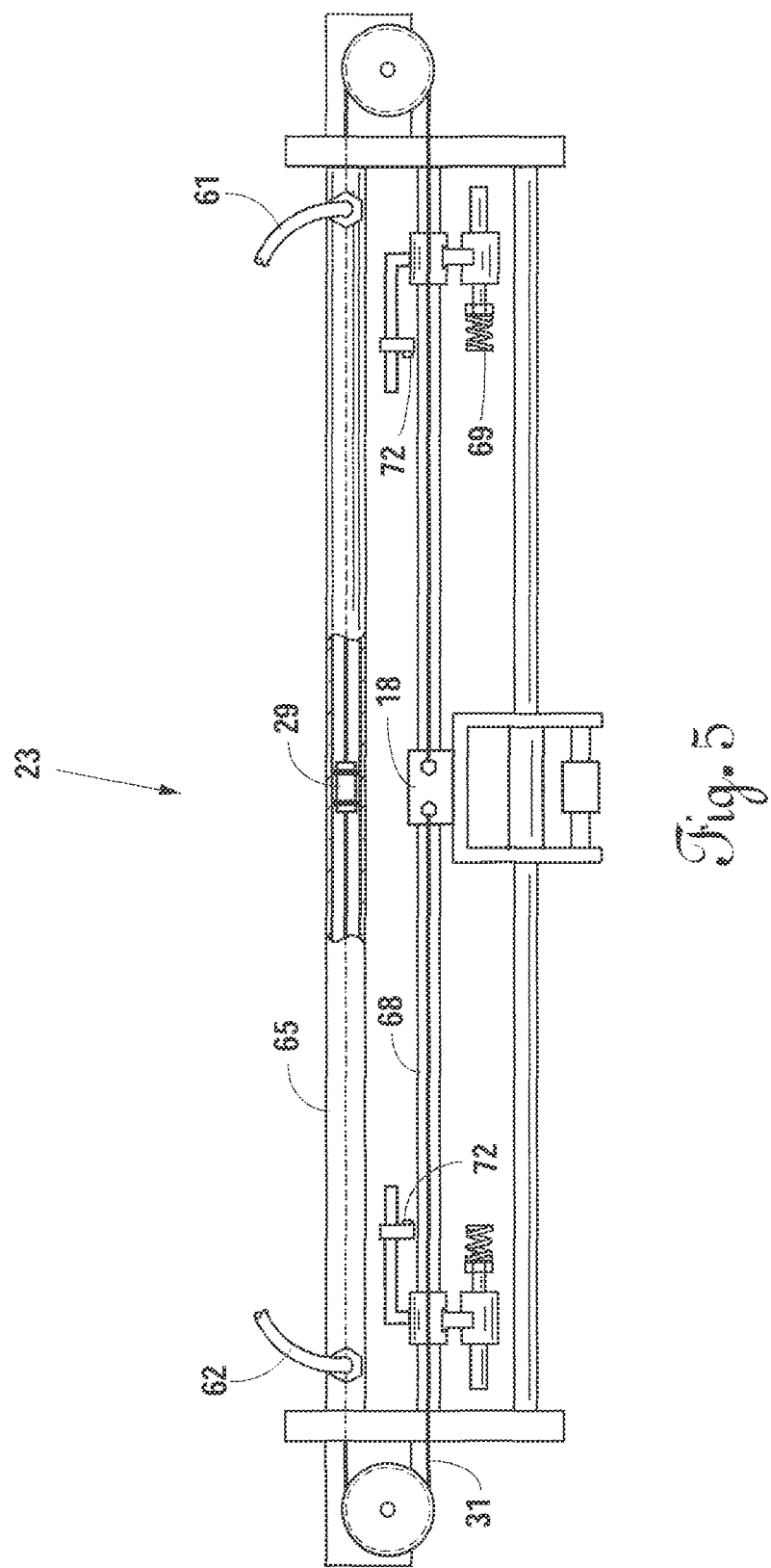
FIG. 5 is a top view of the traveler assembly of the preferred embodiment of the present invention.
Figure 6:
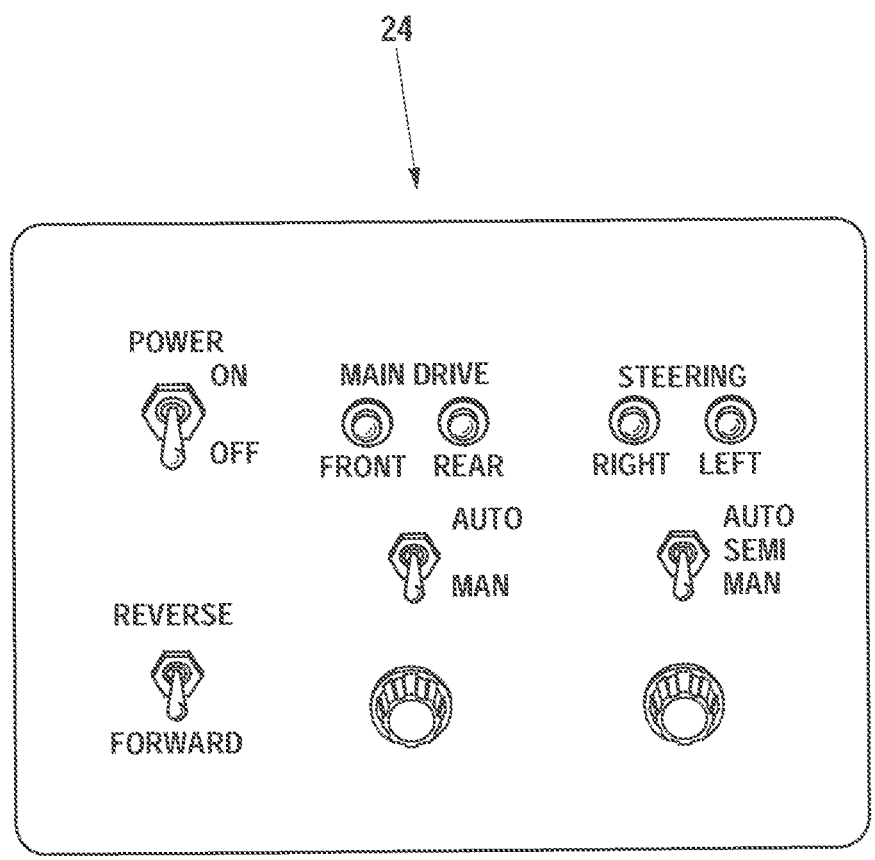
FIG. 6 is a front view of the control panel of the preferred embodiment of the present invention.
Figure 8:
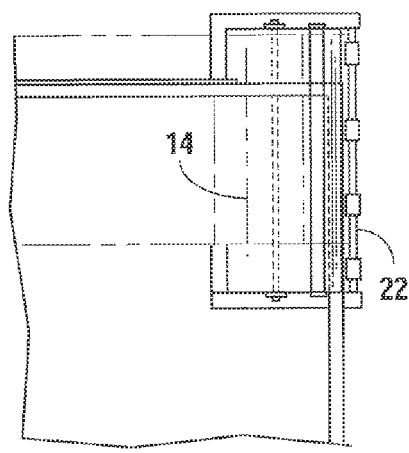
FIG. 8 is a partial top view of the release material assembly of the preferred embodiment of the present invention.

As apparatus 100 moves forward, nozzle 19 dispenses foam as it is moved transversely (side-to-side as viewed in FIG. 4) by the force of compressed air acting against traveler actuator 29 attached to cable 31 inside traveler tube 65 (see traveler assembly 23 in FIG. 5). The preferred embodiment traveler tube 65 is a Parker Origa 120 psi cylinder part number P124-L/28X65-B.

An electrical solenoid valve or fluidics control valve 27 is located between feed air hose 67 (emanating from tee 56 fed by reservoir 57 through hose 60 in FIG. 1) and traveler air hoses 61 and 62 (FIGS. 1 and 5). The valve causes air flow from hose 67 to be shunted into hose 61 or 62 in response to signals received from traveler reversal switches 72 (FIG. 5). When foam nozzle traveler 18, sliding along traveler shaft 68, impacts either reversal switch 72, the control valve switches air flow from hose 61 to 62 or vice versa, thus reversing the direction of actuator 29 and traveler 18. Adjustable traveler accelerators 69 alternately apply spring force that accelerates traveler turn-around to eliminate the lag time inherent in the air flow switching system. Such lag time tends to cause unwanted buildup of excess foam at the edges of the foam strips where traveler motion reverses. Foam is supplied from the Rig through hose 1. Compressed air is supplied from reservoir 57 through hose 60, tee 56, and hose 67.

As apparatus 100 proceeds forward, sheet coating material is laid on top of the newly applied foam. Sheet coating 20, pulled off of a roll and under drive belt 89 by the rotation of drive assembly 90, adheres to the top of the foam as it cures. The coating can be any material chosen for desired characteristics including, but not limited to, insulating capability, impermeability, wear-resistance, paintability, and reflectivity. One coating material candidate is butyl rubber, and others are discussed in the '411 patent.

Figure 3:
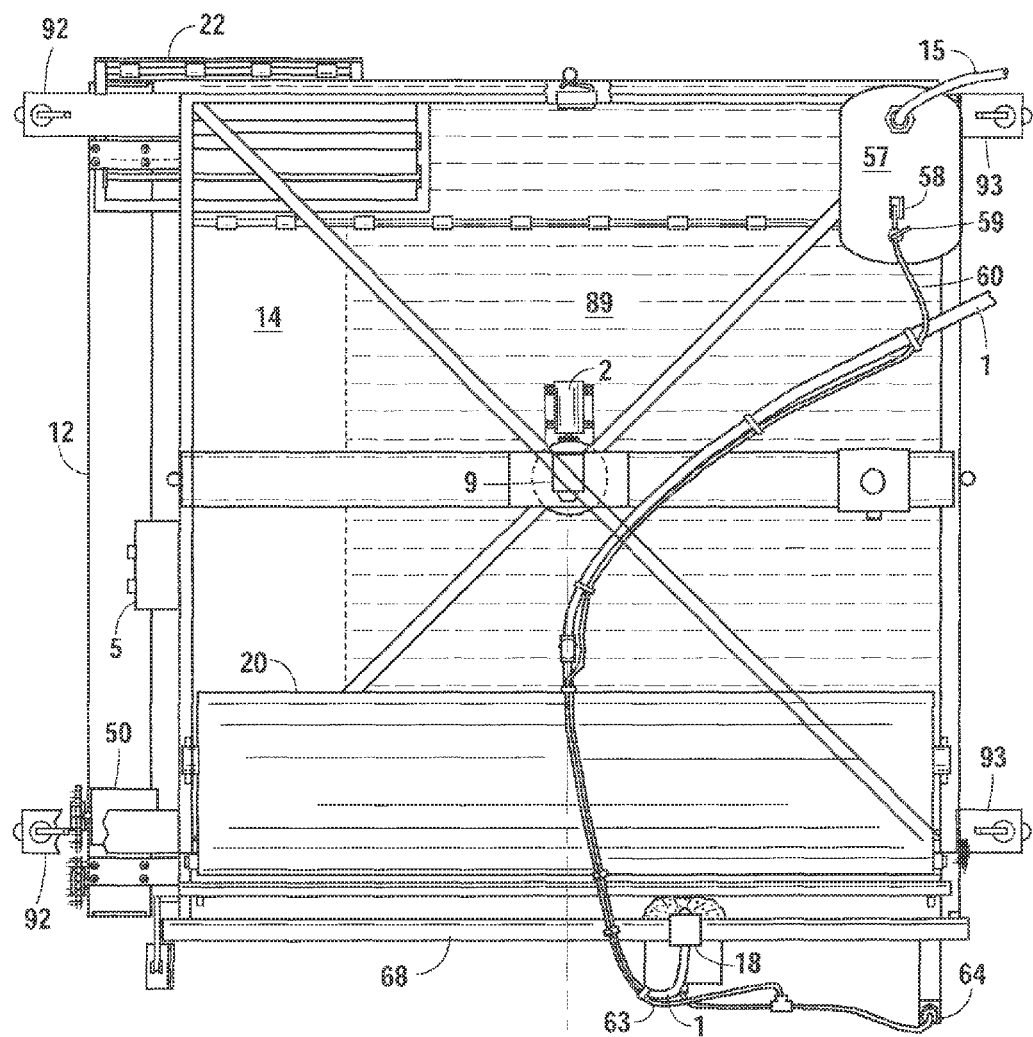
FIG. 3 is a top view of the preferred embodiment of the present invention.
Figure 7:
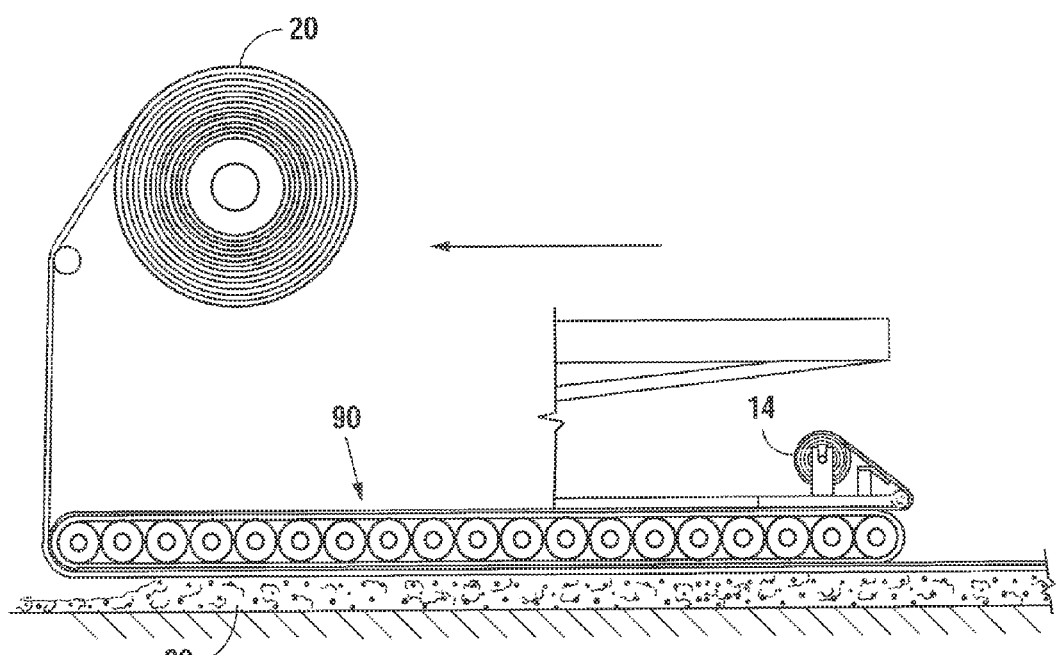
FIG. 7 is a partial side view of the preferred embodiment of the present invention while it is moving right to left.

As apparatus 100 proceeds forward, and as sheet coating 20 is pulled from its roller on top frame 10, a flexible release sheet material is pulled from a separate roller on bottom frame 11. The release material is chosen for its ability to release from curing foam. One release material candidate is polyethylene, and others are discussed in the '411 patent. As shown in FIGS. 2 and 7, release material 14 is pulled off of a roll onto the top of drive belt 89 by the rotation of steering belt 30 further explained below. Release material 14 is pulled forward and between drive belt 89 and sheet coating 20 and ultimately laid on top of a part of sheet coating 20 as the new strip is applied. FIG. 3 shows that release material assembly 22, holding the roll of release material 14, is situated on the side of apparatus 100 containing steering assembly 12. Thus, release material 14 is wide enough to cover only a small part of sheet coating 20 (approximately 1 ft.), extend under kickdown assembly 91, and extend approximately 1 inch under steering belt 30. The release material prevents uncured foam from adhering to kickdown assembly 91 and steering belt 30 during the foam application process. After a foam strip is applied to the working surface, release material 14 is pulled off of the strip of sheet coating and the cured foam bevel and discarded.

Completion of the first strip within the initially-formed perimeter of foamed material is accomplished when an electronic signal generated by a predetermined proximity of laser 9 to target 8 is relayed to computer 6 and motor controller 5 stopping motors 50 and 51 thereby halting motion of apparatus 100 and the foaming operation. After severing sheet coating 20 and release material 14 at the front edge of drive belt 89, apparatus 100 is ready to be moved into place for the process of forming the next adjacent foamed strip.

With two hand cranks 92 and two hand cranks 93 shown in FIG. 1, apparatus 100 is raised just enough to provide clearance between drive belt 89 and the just completed foam layer. With the wheels of hand cranks 92 rolling on working surface 99 and the wheels of hand cranks 93 rolling on the just completed foam layer, apparatus 100 is rolled into place for the process of forming the next adjacent strip. All four hand cranks are then raised until apparatus 100 is supported on one side by steering belt 30 bearing on working surface 99, and on the opposite side by drive belt 89, the edge of which bears on the just completed foam layer close to its beveled edge as shown in FIG. 4. Release material 14 is pulled off of the just completed strip of sheet coating and the cured foam bevel and discarded.

Figure 9:
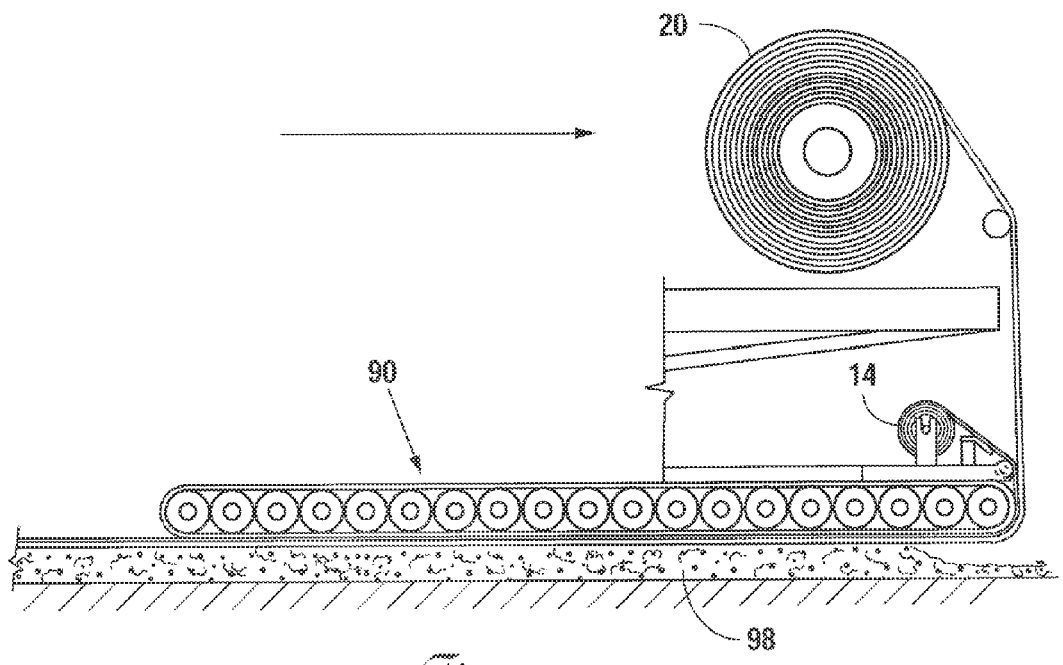
FIG. 9 is a partial side view of the preferred embodiment of the present invention while it is moving left to right.
Figure 10:
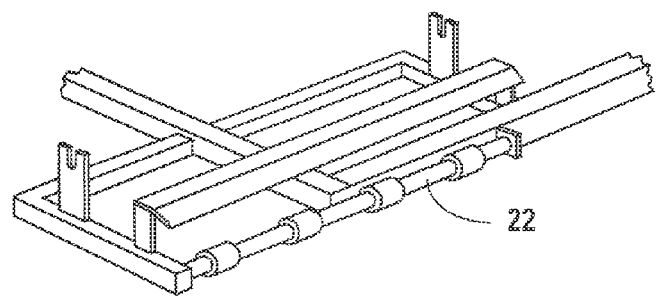
FIG. 10 is a partial orthogonal view of the release material assembly of the preferred embodiment of the present invention.

If during the just completed foam application, apparatus 100 was configured as in FIG. 7 and moving as indicated by the arrow from right to left, apparatus 100 will be configured as in FIG. 9 and moving as indicated by the arrow from left to right during the subsequent foaming application. This is made possible by the improvement that enables the top frame 10 to rotate 180 degrees relative to the bottom frame 11. Top frame 10 rotates about the hinge comprised of pivot shaft 71 and pivot tube 70. Pivot tube gear 25 is turned by a mating bevel gear attached to the drive shaft of pivot motor 2 (FIG. 2A). Thus the present improved invention apparatus 100 can apply strips of foamed polymeric material to a working surface while moving in either direction.

The present invention improvement includes a target 8 that is positioned directly in the sight line of guidance laser 9 each time apparatus 100 applies a foamed strip. When the target is in position and the previously cut leading edges of sheet coating 20 and release material 14 are inserted under the new leading edge of drive belt 89, apparatus 100 is ready to proceed with the next application of foam.

Improvements to the '411 Patent

The present invention provides and claims improvements over the '411 patent: (1) an automated glue option, (2) automated speed control, (3) automated precision guidance, and (4) dual-directional operation.

(1) Automated Glue Option. The present invention provides an improvement over the '411 patent in the form of means for application of glue to the area along the beveled seam of adjacent foam strips. This might be necessary where sheet coating 20, applied during the foaming of a strip, fails to adhere tightly to the top surface of the beveled area of the cured adjacent foam strip. A fan spray of glue from nozzle 64 (FIGS. 1-4) can apply an approximately 3 in. wide strip of glue along the top of the foam joint as it is created, providing a means for good adherence between sheet material 20 and the top of the joint. Glue is supplied from the Rig through hose 3. Air is supplied from reservoir 57 through hose 60, tee 56, and hose 63.

(2) Automated Speed Control. The present invention provides an improvement over the '411 patent in the form of a speed control means for automatically maintaining a desired relationship between the speed of apparatus 100 and the rate of foam application. Different foaming materials cure at different rates depending on composition, driving air pressure, and environmental factors such as sunlight, ambient air density, temperature, and humidity. The best finished foamed surface is produced when apparatus 100 moves at a speed conducive to the optimum curing of the foam. As apparatus 100 proceeds forward, laser range finder assembly 66 monitors the distance between it and the leading edge of the foamed layer as it is being formed (FIGS. 1, 2, and 4). That data is relayed to computer 6 that responds with a command to motor controller 5 that adjusts the speeds of motors 50 and 51 according to an algorithm programmed into computer 6. The forward speed of apparatus 100 is thus automatically controlled to accommodate the foam cure rate produced by on-site prevailing environmental conditions.

(3) Automated Precision Guidance. The present invention provides an improvement over the '411 patent in the form of means for automated precision guidance. Guidance and cessation of motion of apparatus 100 and the foaming operation is controlled with a laser attached to apparatus 100 operating in conjunction with a target fixed to the working surface.

(4) Dual-directional Operation. The present invention provides an improvement over the '411 patent in the form of means for dual-direction operation. When an interior strip (a strip inside the initial perimeter strips) was completed using the '411 patent apparatus, the apparatus had to be manually moved back along the last-formed strip in order to begin applying the next adjacent strip. No foaming was accomplished while the apparatus was being moved the entire length of a foamed strip to its next starting position. All strips were laid with the apparatus moving in the same direction. The present improvement invention eliminates that time-consuming, labor-intensive requirement. Because the top frame 10 of the present invention apparatus 100 rotates 180 degrees relative to the bottom frame 11, the present invention apparatus can apply strips of foamed polymeric material to a working surface while moving forward or backward, cutting a job's required time almost in half.

It will be apparent to those with ordinary skill in the relevant art having the benefit of this disclosure that the present invention provides improvements to an apparatus for in-situ forming of polymeric materials. It is understood that the forms of the invention shown and described in the detailed description and the drawings are to be taken merely as the currently preferred embodiment, and that the invention is limited only by the language of the claims. The drawings and detailed description presented herein are not intended to limit the invention to the particular embodiment disclosed. While the present invention has been described in terms of one preferred and one alternate embodiment, it will be apparent to those skilled in the art that form and detail modifications can be made to the described embodiment without departing from the spirit or scope of the invention. For example, chains and sprockets can be used in place of pulleys and belts; the rotational hinge of apparatus 100 and guidance track 28 can take many forms; foam nozzle traveler lateral motion can be accomplished with a reversible lead screw.

I claim:

1. In an apparatus for in-situ formation of polymeric materials, an improvement comprising:

a first laser fixed to said apparatus whereby the beam of said laser senses the position of the leading edge of said material during said formation;

a first receiver that relays said sensed edge position to a computer algorithm, said algorithm then deriving the speed of said apparatus required for a predetermined rate of said material formation;

for a main driving motor that powers said apparatus, a means of adjusting the speed of said motor to achieve said derived required apparatus speed;

a multi-frame construction of said apparatus wherein a top frame is in a plane above and substantially parallel to a bottom frame;

a reversible, variable-speed drive motor that propels said apparatus in either of two opposed directions on demand; and wherein the to frame rotates 180 degrees relative to the bottom frame so that said material formation can be accomplished while said apparatus is moving in either of said two opposed directions.

2. An improvement as in claim 1 comprising a nozzle for disbursing a predetermined pattern of adhesive over a predetermined area of said formed material during said formation.

3. An improvement as in claim 1 further comprising:

a steering motor that operates independently from the main driving motor of said apparatus;

a second laser fixed to said apparatus whereby the beam of said laser senses the lateral displacement of said apparatus from a target fixed to said working surface; and a second receiver that relays said sensed lateral displacement to a computer algorithm, said algorithm then deriving the speed of said steering motor required for a desired correction of the direction of said apparatus.

4. An improvement as in claim 3 wherein said second laser further senses the distance of said apparatus from said target and causes said apparatus to stop when said distance decreases to a predetermined value.

5. An improvement as in claim 1 further comprising a friction reducer attached to said apparatus, said friction reducer being constrained to movement in a present track so as to maintain the motion of said apparatus in a desired direction over the working surface upon which said track is attached.

* * * * *